Figure 1:
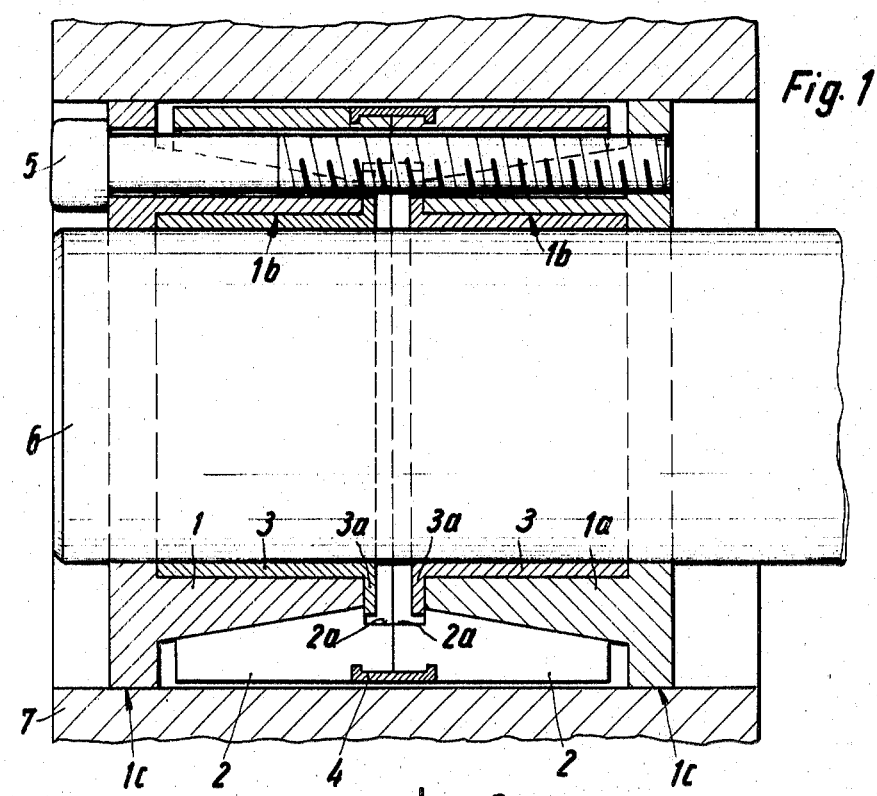

United States Patent [19]

Peter et al.

[11] 3,849,015

[45] Nov. 19, 1974

[54] SYMMETRICAL HUB-TO-SHAFT CONNECTION

[75] Inventors: Oskar E. Peter, Schlosstrasse 9/1, 7129 Brackenheim; Lothar Peter, Guglingen, both of Germany

[73] Assignee: Oskar E. Peter, Brackenheim, Germany

[22] Filed: Sept. 17, 1973

[21] Appl. No.: 398,198

[30] Foreign Application Priority Data

Oct. 24, 1972 Germany.......................... 22521206

[52] U.S. Cl................... 403/370, 403/371, 403/368
[51] Int. Cl.............................................. F16d 1/06
[58] Field of Search .......... 403/370, 371, 374, 369, 403/368, 365, 367; 242/68.3, 72; 308/237; 279/2; 269/48.1; 74/230

[56] References Cited
UNITED STATES PATENTS

| | | | |
|---|---|---|---|
| 2,691,541 | 10/1954 | Benedek | 403/370 |
| 3,127,203 | 3/1964 | Poundstone | 403/365 |
| 3,197,153 | 7/1965 | Davidson | 242/72 |
| 3,273,357 | 9/1966 | Lyon | 403/371 |
| 3,584,473 | 6/1971 | MacDonald | 403/366 |
| 3,656,785 | 4/1972 | Lothar | 403/371 |
| 3,679,247 | 7/1972 | Peter | 403/366 |
| 3,717,367 | 2/1973 | Peter et al. | 403/370 |

*Primary Examiner*—James R. Boler
*Assistant Examiner*—Wai M. Chan
*Attorney, Agent, or Firm*—Flynn & Frishauf

[57] ABSTRACT

To secure a hub to a shaft, inner and outer rings with matching conical surfaces are provided, located between the hub, and the shaft. The inner ring, where it bears against the shaft, is relieved and the relief is filled with a sleeve of a material which is soft with respect to that of the shaft to prevent scoring in case of slippage of the connection; the inner sleeve is, additionally, formed with an outwardly directed collar which fits snugly within the shaft to center the connection, prior to tightly clamping the inner and outer rings against each other by sliding of the conical surfaces. An outer holding ring engages in the outer rings to prevent their loss from the assembly.

5 Claims, 2 Drawing Figures

3,849,015

SYMMETRICAL HUB-TO-SHAFT CONNECTION

CROSS REFERENCE TO RELATED PATENTS AND APPLICATIONS:

U.S. Pat. No. 3,656,785
U.S. Pat. No. 3,679,247
U.S. Pat. No. 3,717,367
U.S. Ser. No. 246,199, Apr. 21, 1972
U.S. Ser. No. 298,987, Oct. 19, 1972, now abandoned.
U.S. Ser. No. 330,744, Feb. 8, 1973

The present invention relates to a hub-to-shaft clamping connection to secure a hub to a shaft, in which the connection utilizes two paired inner clamping rings having outer conical surfaces and paired outer clamping rings having corresponding, matching inner conical surfaces, the clamping rings being tightened against each other by means of clamping bolts.

Various types of hub-to-shaft connections have previously been proposed, see for example, the cross referenced patents and applications and, further, German Pat. No. 1,206,668, specifically FIG. 8 thereof. One of these connections — for example the one referred to in the aforementioned German Patent — utilizes conical inner and outer clamping rings which are paired, and are the mirror image of each other. The outer ends of the clamping rings are engaged by centering rings having rounded, that is, partly circular shaped end rings, between which the actual clamping rings are located. Axial clamping force is transferred to the clamping rings by means of the centering rings by clamping bolts, located in planetary arrangement around the hub. It is comparatively expensive to manufacture such a clamping arrangement, and the number of individual parts required is comparatively great.

Hub-to-shaft connections as generally used frequently are made with conical surfaces of inclinations which are not self binding, that is, self holding, considering the materials employed, so that the connection can be loosened after the axial clamping forces have been released. Otherwise, that is, if self-binding or self-holding angles are selected, a pulling tool is required in order to remove the hub, or wheel, from the shaft. Conical surfaces which have a cone angle which is not self binding have a comparatively small frictional engagement between the conical surfaces, so that the torque which can be transmitted by the arrangement is comparatively small, unless a large number of clamping bolts is used to provide for sufficient, closely applied clamping force. Using a large number of clamping bolts not only substantially increases the manufacturing costs, but also substantially increases the assembly and disassembly of the hub-to-shaft connection, that is, to locate a hub on a shaft, due to the large number of bolts which have to be tightened in a cross-connected manner, and to predetermine torques; assembly, therefore, requires a fair amount of skill to ensure that the hub sits centered on the shaft and that design torque can be transmitted by the connection. Removal of the unit, for example for maintenance or repair of the hub, of the shaft, or of the connection itself also introduces additional assembly and disassembly time.

Practical experience has shown that slippage of a hub-to-shaft connection may cause damage not only to the connection, but to the shaft as well. Repair of such damage is expensive and time consuming, and slippage of the connection can frequently not be readily determined, nor can the damage be easily inspected without disassembly of the hub from the shaft. During assembly, or disassembly, deformation of the clamping arrangement may result since the entire weight of the wheel secured to the hub is placed on the conical clamping rings. These weights may be substantial, for example if they include large gears, inertia flywheels, or the like. The weight of the device or equipment attached to the hub, then, interferes with centrical clamping of the connection, and, upon removal, with release of the clamp connection. The weight, additionally, interferes with the torque transfer since the axial clamping force of the conical surfaces is impaired by the weight of the associated devices connected to the hub, and bearing on the connection itself.

It is an object of the present invention to improve a hub-to-shaft clamping connection, in which the arrangement is simplified, torque transfer is increased, and centricity of the drive is enhanced; additionally, the clamping connection should be capable of being released, and should be so arranged that, upon exceeding of limiting torque, no damage to the connection or to the shaft will result.

SUBJECT MATTER OF THE PRESENT INVENTION

Briefly, pairs of inner and outer clamping rings are provided, having, respectively, outer and inner conical surfaces. The inner rings have an interior relief in which a sleeve is press fitted. The sleeve has an outwardly directed flange fitting into, or against the inner end facing surfaces of the inner sleeves. The press fitted sleeve is made of a material which, under emergency condition, can act as a bearing, that is, can provide slippage between the shaft and the hub-to-shaft connection (which, due to the greater circumference of the outer rings, is usually tight in the hub); the material, therefore, should be softer than the material of the shaft — usually steel — to prevent scoring or damage to the shaft; further, and since it is press fitted, it should be replaceable from the inner rings.

The outer conical rings engage at their inner matching surfaces; they are preferably slit, to permit expansion; they are held in position on the assembly by means of a slit metal ring with inwardly directed flanges, so that it will have a U-shape in cross section. The inner rings, at the outer facing sides, are additionally, preferably, formed with cylindrical radially extending flanges to provide centering flanges, fitting snugly within the bore of the hub, and having a nominal outer diameter which is greater, preferably just slightly greater, than the nominal outer diameter of the slit outer clamping rings. Additionally, and in accordance with a preferred form, tapped bores are provided in the outer rings, so that the clamping screws which penetrate, normally, through the rings can be removed and, by bearing against the inner edge surfaces, can be utilized as press-off screws without requiring further removal or wheel pulling tools to release the connection.

The hub-to-shaft connection, which is symmetrical, is simple, and provides a complete assembly from which no parts can become lost or displaced. The hub, to be placed on the shaft, is centered by the outer flanges, even before tightening of the clamping assembly, by which torque can be transmitted between the hub and the shaft. The outer clamping rings, with the inner conical surfaces, are held together by the slit metal ring with the depending flanges to form, together with the inner rings (to which the inner sleeve is attached) a complete assembly which, however, permits axial and radial relative movement of the various rings. The coupling, with the two inner clamping rings and the two outer clamping rings thus permits manufacture of the conical surfaces with such angles of inclination that the conical surfaces will be self-binding; this permits much greater torque transfer than if the conical surfaces are steeper, so as to be non-self binding. Removal is ensured, however, by tapping the press-off bores in one of the sets of rings.

Selecting the angle of inclination of the conical surfaces such that self-binding effects are obtained permits transfer of a high degree of torque, so that the number of clamping bolts, located in a circle around the set, can be substantially reduced with respect to a set in which the angle of inclination is non-self binding. Further, greater torques can be transmitted, even under heavy dynamic loading, such as sudden and shock-like reversals of rotation. The assembly and disassembly times are substantially reduced, resulting in lesser installation costs. The centering flanges, of slightly greater nominal diameter than the outer clamping rings provide for exact centricity of the hub on the shaft, before clamping, so that clamping pressure will be uniformly applied throughout the circumference of the assembly. The force transfer diagram will be uniform over the entire circumference of the shaft, with respect to the hub.

The inner sleeves, preferably press fitted into the inner clamping rings with the outer conical surfaces and made of a material which is somewhat softer than that of the shaft have the advantage that, if the maximum torque transmission of the coupling is exceeded, the shaft of the machine will not be damaged in case of slippage of the coupling over the shaft. The coupling, therefore, is a safety coupling, in which torque is transmitted symmetrically throughout the axial length of the coupling, which, however, has the additional advantage that repair costs to the shaft can be substantially decreased in case slippage should occur upon substantial and excessive overload of the connection.

The conical rings, while preferably symmetrically arranged, can be ground to be off center, or the interior sleeves can be made to be off center in order to compensate for possible eccentricities of the shaft, or of the hub, due to prior damage to either of these components. The lengths of the hub-to-shaft connection can be selected in accordance with proper design requirements, for example the axial length of the hub, the length of the shaft, and the torque to be transmitted. Since the inner clamping rings are entirely closed, and not axially slit, they will surround the shaft completely, providing uniformly distributed circumferentially extending forces. Concentrated force points, which may have a tendency to diminish the strength of the shaft due to notch effects and tears in the metal resulting from force concentration, are likewise avoided.

Figure 2:
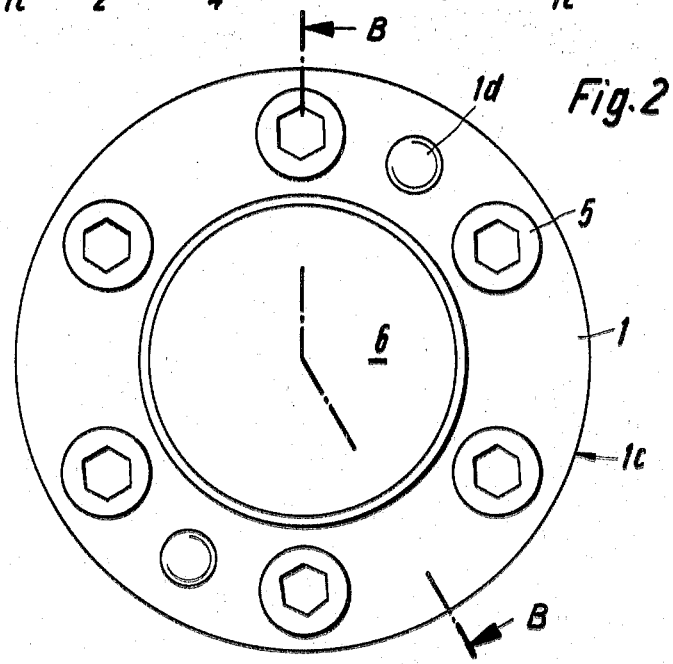

The invention will be described by way of example with reference to the accompanying drawings, wherein:

FIG. 1 is an axial longitudinal cross sectional view of a hub-to-shaft connection, to connect a hub (for example of a gear) to a shaft, before clamping forces are applied, the section being taken along line B—B of FIG. 2; and FIG. 2 is an end view of the connection in accordance with FIG. 1.

Two inner clamping rings 1, 1a, are formed with outer conical surfaces, having their small conical diameter at the inner side. The ends of the inner rings 1, 1a are formed with centering flanges 1c. The outer diameter of the flanges 1c is slightly greater than that of the nominal diameter of outer conical rings 2, 2, having conical surfaces which fit against, and match the angle of inclination of the conical surfaces on the inner rings 1, 1a. The inner rings, at their inner surfaces, are formed with a cylindrical relief in which sleeves 3 are press-fitted. The sleeves 3 have externally radially extending circumferential flanges 3a. The sleeves 3 are made of a material which is non-scoring with respect to the material of the shaft 6. The circumferential flanges 3a fit into corresponding reliefs 2a, 2a in the outer conical rings 2, 2. The outer conical rings are slit, and held together at the outside by means of a circumferential metal ring 4, which has inwardly directed end flanges that is, which is formed with a general U-shape cross section. Ring 7 is axially slit to permit slight spreading thereof and assembly over the rings 2, 2. The rings 1, 1a, with their inserted sleeves 3, and the outer rings 2 are thus held together in one unit, the press fit of the sleeves 3 with the projecting flanges 3a holding the rings 1, 1a in the matching recesses 2a, 2a of the outer rings 2. Thus, all the elements of the hub-to-shaft connection are secured together for unitary assembly, simplicity of handling, and to prevent loss of parts.

The inner ring 1 is formed with press-off bores 1d which are tapped holes, extending only through the inner rings 1. A plurality of clamping bolts 5, preferably in a form of recess-head bolts are located in planetary arrangement about the center of the hub-to-shaft connection, passing through bores formed in the inner and outer rings, as seen at the top portion of the section of FIG. 1. The bores extending to the end flange 1c at the right hand side of FIG. 1 are tapped so that when the bolts 5 are tightened, torque can be transmitted from shaft 6 to hub 7, and the entire assembly is retained together.

OPERATION

Upon tightening of the bolts 5, the inner rings 1, 1a are moved axially together, that is, towards the inside of a hub-to-shaft connection, thus providing for operative engagement of the conical surfaces of the rings 1, 1a and of the rings 2, to provide for radial pressure between shaft 6 and the bore of hub 7, so that torque can be transmitted between hub and shaft. If the connection is to be removed, then the various bolts 5 are loosened and two bolts taken out entirely, inserted in the tapped holes 1d and tightened so that the ends of the bolts 5 will bear against the end faces of the right hand rings 1a, 2 to press them away from each other. This releases the inner rings 1, 1a from each other and thus releases the clamping pressure which is exerted in radial direction by engagement of the self binding conical surfaces.

The outer rings 2, 2 are slit axially to permit expansion; likewise, ring 4 is slit axially, the slits preferably being located offset with respect to each other.

The rings 1, 1a, 2, of the hub-to-shaft connection are preferably made of steel. The insert sleeves 3, 3 are preferably made of brass, cast iron with graphite addition, selflubricating plastics materials.

We claim:

1. In a symmetrical hub-to-shaft clamping connection, to secure a hub (7) on a shaft (6),
a pair of inner clamping rings (1, 1a) having outer, oppositely directed conical surfaces;
a pair of outer clamping rings (2, 2) having inner oppositely directed, matching conical surfaces, and outer cylindrical surfaces for clamping the rings to the hub;
axial bores penetrating through said clamping rings, and clamping bolts (5) threaded in the bores to axially clamp the inner and outer rings against each other and engage said conical surfaces;
wherein the improvement comprises
a cylindrical relieved surface (1b) formed on the inner surface of the clamping rings (1, 1a);
a ring-shaped cutout (2a) formed in the facing surface of the outer clamping rings (2);
sleeve members (3) seated in cylindrical relieved surfaces (1b) and made of a material which is soft with respect to the shaft, or the clamping rings, respectively, to prevent scoring in case of slippage of the shaft with respect to the rings, said sleeve members being secured in the inner clamping ring by means of an interference fit, and being formed with outwardly directed flanges (3a) fitting radially around the inner end surfaces of the inner rings (1, 1a) and into said ring-shaped cutout (2a) of the outer rings (2);
an axially slit ring (4) of U-shaped cross section engaging the outer clamping rings (2) adjacent the facing surfaces to secure the rings into a single assembly;
and terminal flanges (1c) formed adjacent the outer end faces of the rings (1, 1a).

2. Connection according to claim 1 wherein the terminal flanges (1c) formed adjacent the outer end faces of the inner rings (1, 1a) are of slightly greater diameter than the outer nominal diameter of the outer rings when the outer rings are located on the inner rings with the conical surfaces in engagement in positions where the outer diameter of the outer rings will be a minimum.

3. Connection according to claim 1 further comprising tapped bores (1d) formed in only one of the pairs of the rings to provide a press-off bore for introduction of a bolt therein to release the conical surfaces from relative engagement.

4. Connection according to claim 1 wherein the outer sleeves are axially slit to permit expansion thereof and the cone angle is selected to make the connection self binding.

5. Connection according to claim 1 wherein the sleeve members comprise at least one material selected from the group of brass, cast iron with graphite addition, selflubricating plastics materials.

* * * * *